(12) United States Patent
Tan et al.

(10) Patent No.: US 12,394,347 B1
(45) Date of Patent: Aug. 19, 2025

(54) METHOD OF OBTAINING COLOR CALIBRATION INFORMATION FOR AN ELECTRONIC DEVICE

(71) Applicant: Apple Inc., Cupertino, CA (US)

(72) Inventors: Guanjun Tan, Santa Clara, CA (US); Shengchang Cai, Santa Clara, CA (US); Jin Li, San Jose, CA (US); Giovanni Carbone, Palo Alto, CA (US); Kyu Hyun Kim, Santa Clara, CA (US); Tahereh Majdi, Sunnyvale, CA (US); Aditi G Kanhere, Fremont, CA (US); Sheng Zhang, San Jose, CA (US); Youngbae Son, San Jose, CA (US); Sijia Ma, Beijing (CN); Tong Zhu, San Diego, CA (US); Lingyu Zhu, Shanghai (CN)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 18/365,798

(22) Filed: Aug. 4, 2023

Related U.S. Application Data

(60) Provisional application No. 63/404,396, filed on Sep. 7, 2022.

(51) Int. Cl.
  *G09G 3/20* (2006.01)
  *G06F 3/01* (2006.01)
  (Continued)

(52) U.S. Cl.
  CPC .......... *G09G 3/2003* (2013.01); *G06F 3/013* (2013.01); *G06T 7/70* (2017.01); *G06T 7/90* (2017.01);
  (Continued)

(58) Field of Classification Search
  CPC ......... G09G 3/2003; G09G 2320/0242; G09G 2320/0666; G09G 2320/0693;
  (Continued)

(56) References Cited

U.S. PATENT DOCUMENTS

| | | | | |
|---|---|---|---|---|
| 7,012,633 | B2 * | 3/2006 | Jenkins | G01J 3/46 348/222.1 |
| 7,907,154 | B2 * | 3/2011 | Rykowski | G09G 5/10 345/1.1 |

(Continued)

*Primary Examiner* — Rodney Amadiz
(74) *Attorney, Agent, or Firm* — Treyz Law Group, P.C.; Joseph F. Guihan

(57) ABSTRACT

An electronic device may have a display panel. Light from the display panel may be focused by a lens assembly towards a viewer. Optical crosstalk, off-axis color shift, and/or the presence of the lens assembly may cause color non-uniformity in images viewed through the lens assembly. To obtain color calibration information, first information may be used to simulate the color of the display panel when viewed through a lens assembly from a first number of points. The first information may include an average display panel color emission profile and a map of correlation between pixel locations and incident angles and corresponding pupil locations and gaze directions. The color of the display panel through the lens assembly may be measured at the first number of points to extract a lens non-uniformity contribution. The lens non-uniformity contribution may then be used to simulate color at a second, larger number of points.

22 Claims, 12 Drawing Sheets

(51) Int. Cl.
*G06T 7/70* (2017.01)
*G06T 7/90* (2017.01)

(52) U.S. Cl.
CPC ............ *G06T 2207/10024* (2013.01); *G06T 2207/30201* (2013.01); *G09G 2320/0242* (2013.01); *G09G 2320/0666* (2013.01); *G09G 2320/0693* (2013.01); *G09G 2354/00* (2013.01)

(58) Field of Classification Search
CPC ....... G09G 2354/00; G06F 3/013; G06T 7/70; G06T 7/90; G06T 2207/10024; G06T 2207/30201; H04N 13/327; H04N 13/15; H04N 13/239; H04N 13/324; H04N 13/344; H04N 13/106; H04N 13/246; H04N 13/279; H04N 2013/0081; H04N 17/004; G02B 27/0172; G02B 2027/0138; G02B 2027/0116
See application file for complete search history.

(56) References Cited

U.S. PATENT DOCUMENTS

| | | | |
|---|---|---|---|
| 7,911,485 B2 * | 3/2011 | Rykowski | G09G 5/06 |
| | | | 345/690 |
| 2013/0342662 A1 * | 12/2013 | Kaneko | H04N 13/324 |
| | | | 348/53 |
| 2016/0240125 A1 * | 8/2016 | Sridharan | G09G 5/026 |
| 2016/0314564 A1 | 10/2016 | Jones et al. | |
| 2017/0329136 A1 * | 11/2017 | Bates | G06T 3/18 |
| 2018/0084232 A1 | 3/2018 | Belenkii et al. | |
| 2020/0090575 A1 * | 3/2020 | Martin | G06F 3/012 |
| 2021/0098535 A1 | 4/2021 | Cai et al. | |
| 2022/0099975 A1 * | 3/2022 | Schultz | G09G 3/36 |
| 2022/0121280 A1 | 4/2022 | Jones et al. | |
| 2022/0146828 A1 * | 5/2022 | Ohba | G09G 5/003 |

* cited by examiner

METHOD OF OBTAINING COLOR CALIBRATION INFORMATION FOR AN ELECTRONIC DEVICE

This application claims priority to U.S. provisional patent application No. 63/404,396, filed Sep. 7, 2022, which is hereby incorporated by reference herein in its entirety.

BACKGROUND

This relates generally to electronic devices, and, more particularly, to electronic devices with displays.

Electronic devices often include displays. For example, an electronic device may have a liquid crystal display (LCD) based on liquid crystal display pixels or an organic light-emitting diode (OLED) display based on organic light-emitting diode pixels. Head-mounted displays such as virtual reality glasses use lenses. If care is not taken, the lenses may cause visible artifacts in an image viewed through the lenses.

SUMMARY

An electronic device may have a display panel of a given type and a lens assembly. The display panel may be viewable through the lens assembly from an eye box. A method of obtaining color calibration information for the electronic device may include measuring first information that comprises information regarding color emission as a function of viewing angle for the given type of display panel, determining a map of pixel locations and incident angles on the display panel in the electronic device to corresponding pupil locations and gaze directions in the eye box, measuring second information that comprises information regarding color at a first number of locations within the eye box, using at least the first information, the map, and the second information, simulating color at a second number of locations within the eye box, wherein the second number is greater than the first number, and using the simulated color at the second number of locations within the eye box, determining color calibration information for the electronic device.

A method may include measuring an average profile for color emission as a function of viewing angle for multiple display panels of a given type, mapping pixel locations and incident angles on the display panel to corresponding pupil locations and gaze directions in an eye box for an electronic device that includes a display panel of the given type and a lens assembly, simulating color of the display panel at a first number of pupil locations in the eye box using the average profile and the map of pixel locations and incident angles on the display panel to corresponding pupil locations and gaze directions, measuring the color of the display panel at the first number of pupil locations in the eye box using a camera, extracting a lens non-uniformity contribution using the simulated color of the display panel at the first number of pupil locations and the measured color of the display panel at the first number of pupil locations, and simulating color of the display panel at a second number of pupil locations in the eye box that is greater than the first number using at least the average profile, the map, and the lens non-uniformity contribution.

A method may include simulating the color of a display panel when viewed through a lens assembly from at least two points using first information, measuring the color of the display panel when viewed through the lens assembly from the at least two points, and simulating the color of the display panel when viewed through the lens assembly from at least fifty points using at least the first information and a comparison between the simulated color and the measured color.

DETAILED DESCRIPTION

Figure 1:
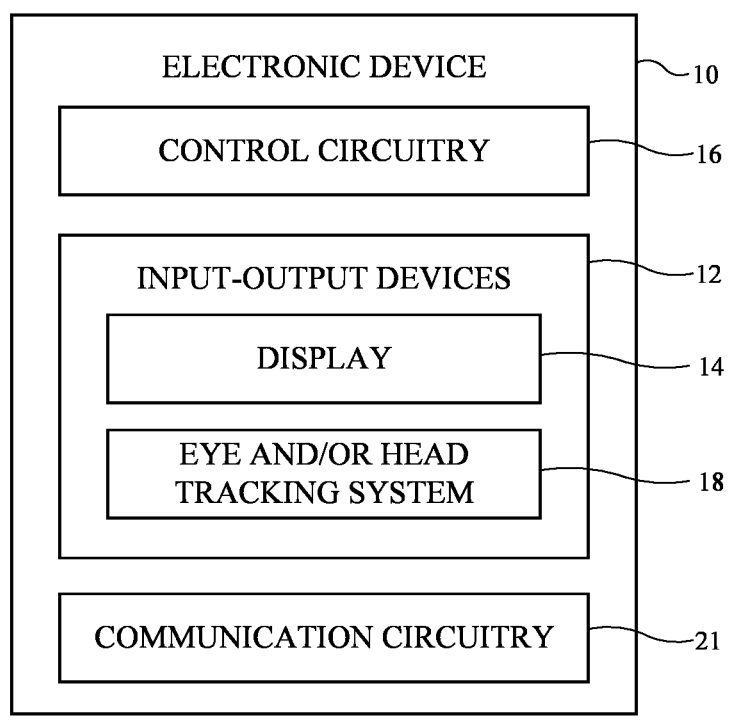
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user. As examples, electronic device 10 may be an augmented reality (AR) headset and/or virtual reality (VR) headset.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, keypads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Device 10 may include cameras and other components that form part of eye and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). Eye and/or head tracking system 18 may include any desired number/combination of infrared and/or visible light detectors. Eye and/or head tracking system 18 may optionally include light emitters to illuminate the scene.

In addition to determining the position of the viewer's eyes, eye and/or head tracking system 18 may determine the gaze direction of the viewer's eyes. Eye and/or head tracking system 18 may include a camera and/or other gaze-tracking system components (e.g., light sources that emit beams of light so that reflections of the beams from a user's eyes may be detected) to monitor the user's eyes. One or more gaze-tracker(s) in system 18 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or may determine other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze.

The example of using an optical component (e.g., camera or image sensor) in the eye and/or head tracking system 18 is merely illustrative. If desired information from one or more additional (non-optical) components may also or instead be used in eye and/or head tracking system 18. For example, eye and/or head tracking system 18 may include electromyogram-based eye tracking components.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Figure 2:
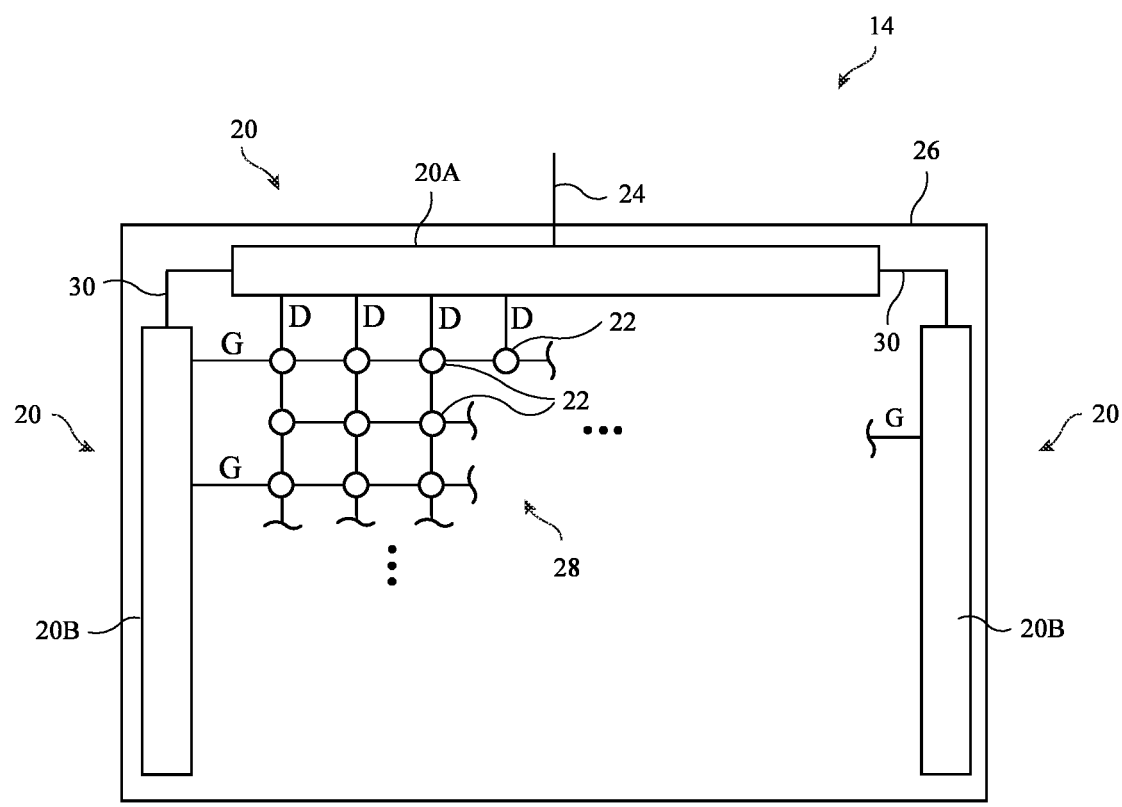
FIG. 2 is a schematic diagram of an illustrative display in accordance with some embodiments.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, silicon layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14.

Each pixel 22 may have a light-emitting diode and circuitry (e.g., thin-film circuitry on substrate 26) that responds to the control and data signals from display driver circuitry 20.

Gate driver circuitry 20B may include blocks of gate driver circuitry such as gate driver row blocks. Each gate driver row block may include circuitry such output buffers and other output driver circuitry, register circuits (e.g., registers that can be chained together to form a shift register), and signal lines, power lines, and other interconnects. Each gate driver row block may supply one or more gate signals to one or more respective gate lines in a corresponding row of the pixels of the array of pixels in the active area of display 14.

Display 14 for device 10 may be a liquid crystal display, an organic light-emitting diode display, an electrophoretic display, a plasma display, an electrowetting display, a display formed using other display technologies, or a display that uses two or more of these display technologies in a hybrid configuration.

Figure 3:
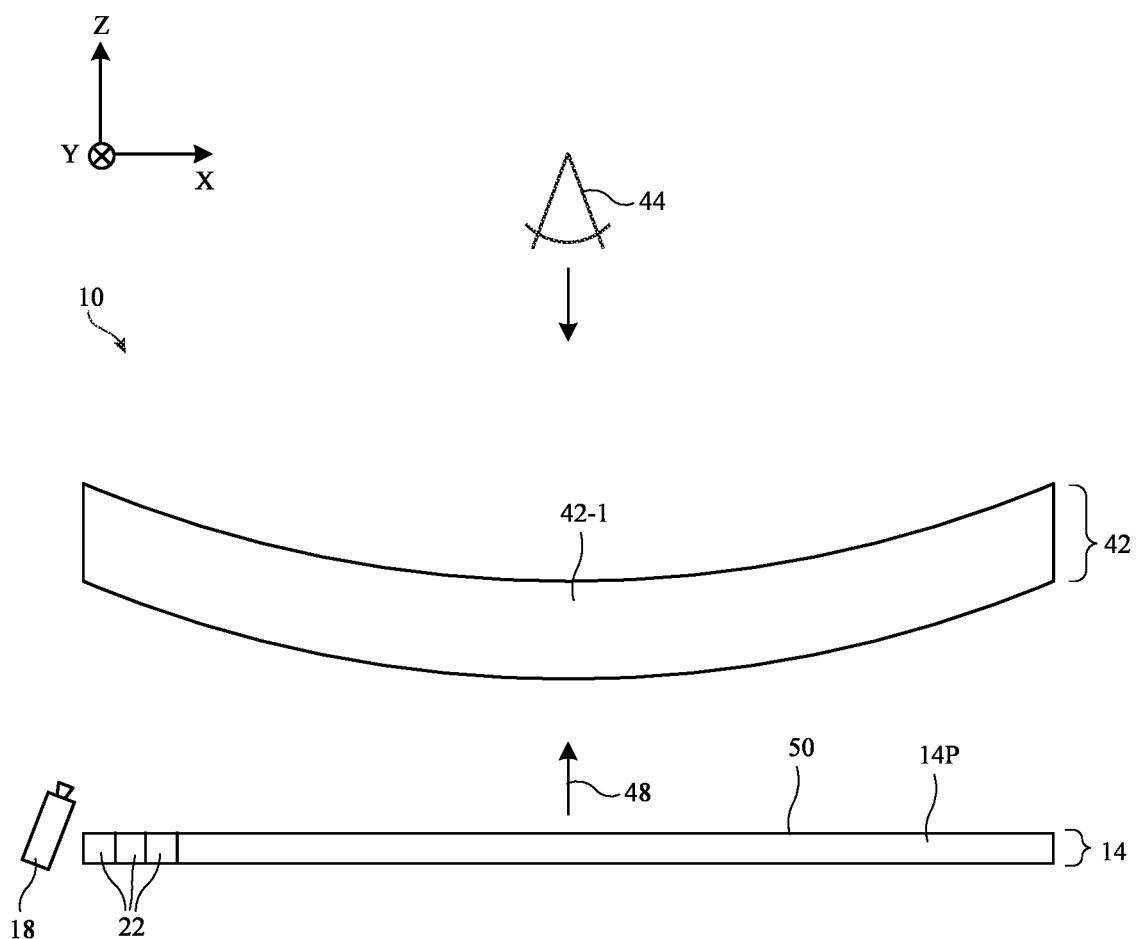
FIG. 3 is a cross-sectional side view of an illustrative electronic device having a display and a lens assembly in accordance with some embodiments.

FIG. 3 is cross-sectional side view of an illustrative electronic device that includes a display and one or more lens elements. As shown in FIG. 3, lens assembly 42 (sometimes referred to as lens module 42) is included in device 10 in addition to display 14. The lens assembly may optionally be a catadioptric lens assembly (e.g., a lens assembly that both reflects and refracts incident light). The lens assembly may include a lens element such as lens element 42-1. Lens assembly 42 may focus light towards viewer 44 (who may view the display in the negative Z-direction in FIG. 3).

There are many possible arrangements for lens assembly 42. In general, the lens assembly may include one lens element, two lens elements, three elements, more than three elements, etc. Each lens element may have any desired combination of convex surfaces and concave surfaces. The convex and concave surfaces may be spherical, aspherical, cylindrical, or have any other desired curvature. The lens assembly may include other optical layers such as one or more linear polarizers, one or more quarter waveplates, one or more partial mirrors, one or more reflective polarizers, etc.

As previously mentioned, lens assembly 42 may be a catadioptric lens assembly. However, this need not be the case. The lens assembly may instead be a refractive lens assembly, may use one or more Fresnel lenses, etc.

As shown in FIG. 3, display 14 may include a display panel 14P. Display panel 14P may include an array of display pixels 22 similar to as shown in FIG. 2. The display panel may be an organic light-emitting diode display panel, a liquid crystal display panel, or a display panel including pixels formed from any other desired type of display technology. Display panel 14P may emit light in direction 48 in FIG. 3. Direction 48 may be parallel to the Z-axis. In other words, the chief ray angle of light emitted from the display may be orthogonal to the front surface 50 of the display panel.

As shown in FIG. 3, eye and/or head tracking system 18 may be included adjacent to display 14 and may capture images of viewer 44 during operation of device 10.

If care is not taken, the presence of lens assembly 42 may cause color non-uniformity for viewer 44 viewing images on display 14 through lens assembly 42. There are many contributing factors to color non-uniformity in device 10. Color non-uniformity may be caused by the lens collection angle varying across the panel (e.g., because the lens is not a telecentric lens). Pixels 22 within display panel 14P may have a color emission profile that varies as a function of viewing angle. For example, pixels 22 may be organic light-emitting diode (OLED) pixels with a strong cavity effect that causes the color profile to vary as a function of viewing angle. Display panel 14P may also include color filter elements positioned over the display pixels. The color filter elements may sometimes cause optical cross talk (e.g., when light from a nominally blue pixel passes through a red color filter).

If care is not taken, these various sources of color non-uniformity may contribute to visible artifacts in the display panel. For example, display panel 14P may display a uniform white color across the entire display. Color non-uniformity may cause portions of the image (e.g., at the edges of the display panel) to have a varying color when viewed by viewer 44 through lens assembly 42.

Color non-uniformity in device 10 may vary as a function of pupil position and gaze direction. To correct for color non-uniformity, the pupil position and gaze direction of the user's eyes may be measured in real time (e.g., by eye and/or head tracking system 18). Based on the real time pupil position and gaze direction and stored calibration information, control circuitry 16 within device 10 may compensate images on display panel 14P to mitigate color non-uniformity. Consider the example where the display intends to display uniform white color across the entire display panel. When color compensation is used, the image on the display panel may have a non-uniform color to compensate for color non-uniformities imparted by the system. When the image is viewed by the viewer at the given pupil position and gaze direction (after passing through the color filter elements and lens assembly 42), the image has a uniform white appearance.

Figure 4:
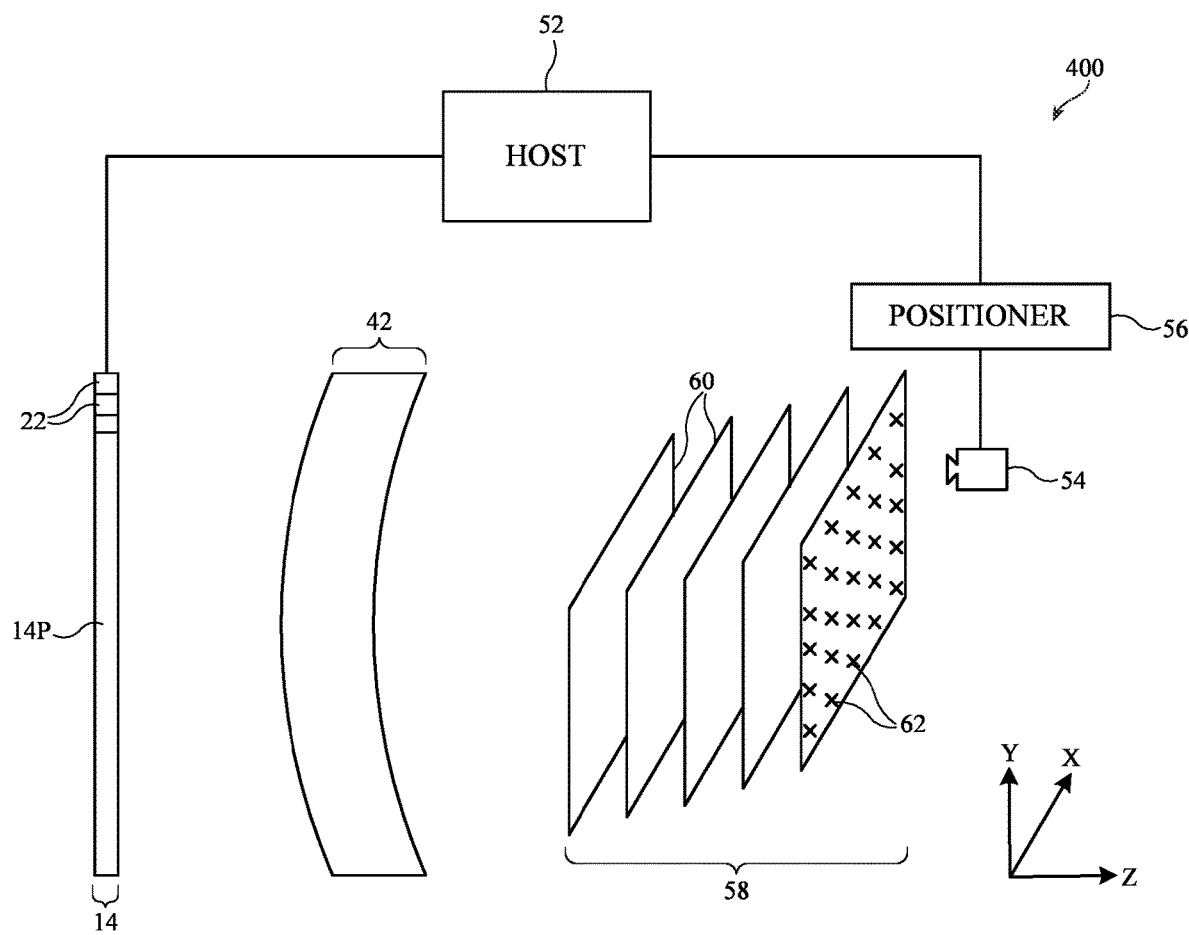
FIG. 4 is a schematic diagram of illustrative color calibration equipment in accordance with some embodiments.

FIG. 4 is a diagram of illustrative color calibration equipment 400 that may be used to obtain color calibration information for an electronic device. In the example of FIG. 4, display panel 14P emits light through lens assembly 42. A camera 54 may be positioned behind lens assembly 42 to capture images of display panel 14P through lens assembly 42. Equipment 400 may include a host 52. Host 52 may include one or more computers. Host 52 may include software that runs autonomously or semi-autonomously on the computer to operate equipment 400.

Host 52 may control operation of display panel 14P and camera 54. For example, host 52 may direct display panel 14P to display certain images, emit light with one or more pixels, etc. Host 52 may direct camera 54 to capture images. Equipment 400 may include one or more computer-controlled positioners that are controlled by host 52. For example, a computer-controlled positioner 56 may be attached to camera 54. Host 52 may control positioner 56 to adjust the position of camera 54.

To obtain color calibration information, camera 54 may capture images of display panel 14P through lens assembly 42 at a number of points within eye box 58. Eye box 58 is a three-dimensional area that represents the most likely locations for the pupil of a viewer during operation of device 10.

Color non-uniformity may vary as a function of pupil-distance (sometimes referred to as eye relief) from the lens assembly (e.g., the separation between the pupil and the lens assembly in the Z-direction). Therefore, camera 54 may capture images in a number of different planes 60. Each plane is a different distance from lens assembly 42. Each plane is plane parallel to the XY-plane.

Color non-uniformity may vary as a function of pupil location within each two-dimensional plane 60. Therefore, within each plane, camera 54 may capture images at a number of different points 62. Each point 62 is at a different position within the plane. For simplicity of the drawings, the points 62 are only explicitly marked on one of the five planes in FIG. 4. However, each plane may include points in the same pattern as depicted on the right-most plane of FIG. 4.

At a given pixel location, color non-uniformity may vary as a function of gaze direction. Therefore, at each point 62, camera 54 may capture images while pointing at different portions of display panel 14P (to simulate a pupil gazing at different portions of display panel 14P).

Figure 5A:
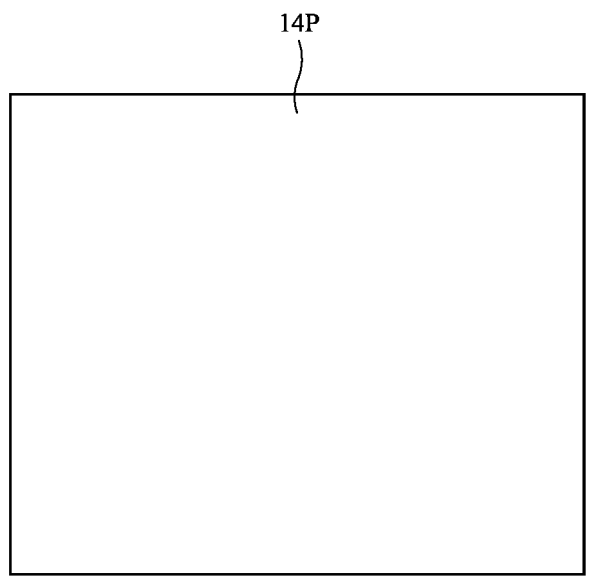
FIGS. 5A and 5B are views of an illustrative display panel through a lens assembly when color calibration is not used in accordance with some embodiments.
Figure 5B:
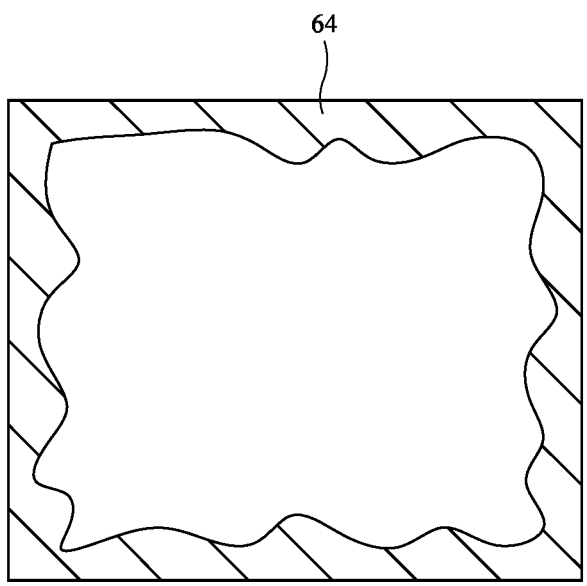

Using equipment 400 of FIG. 4, color calibration information may be obtained that is subsequently used for color calibration of images on display panel 14P in real time. FIGS. 5A and 5B show an example of color non-uniformity in device 10 (without color calibration). As shown in FIG. 5A, display panel 14P may display a uniform image (e.g., a uniform white screen). However, FIG. 5B shows the image as perceived by a viewer at a given pupil location. Portions 64 of the display are non-uniform (e.g., exceed a non-uniformity threshold) when perceived by the viewer.

Figure 6:
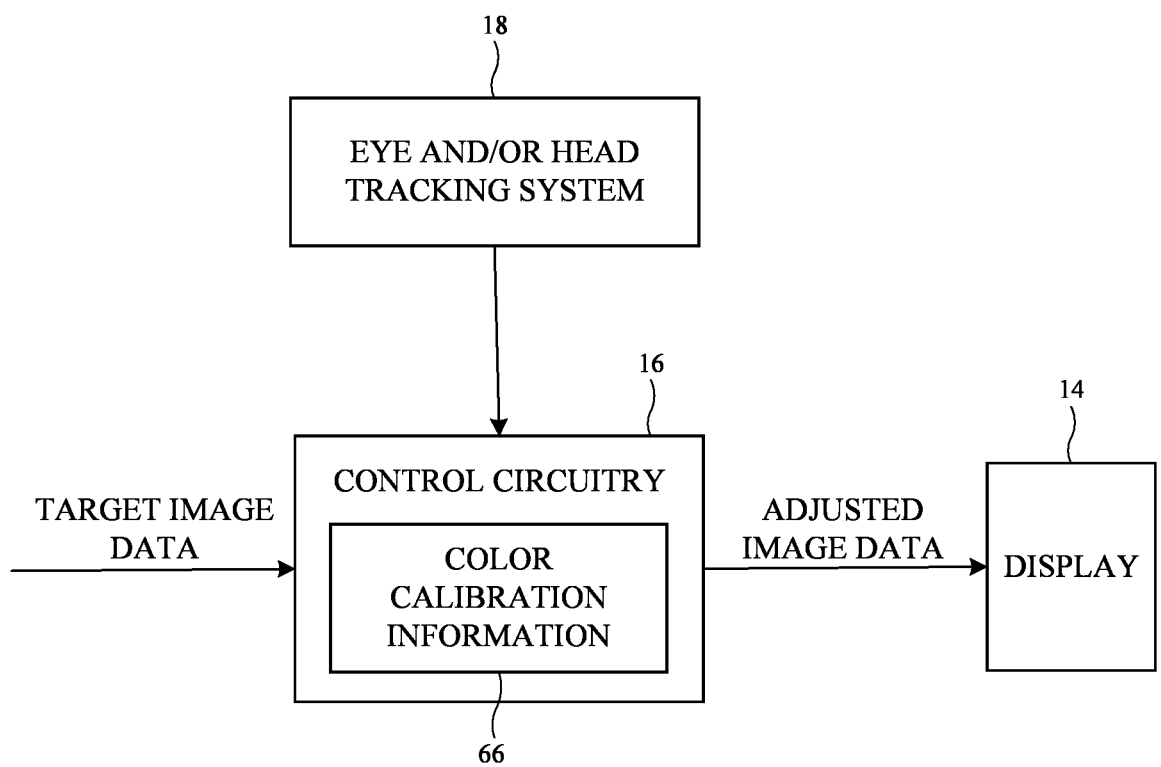
FIG. 6 is a schematic diagram of an illustrative electronic device that adjusts target image data to compensate for color non-uniformity in accordance with some embodiments.

To rectify this, as shown in FIG. 6, control circuitry 16 may receive target image data (e.g., an image that is intended to be displayed for the viewer). The control circuitry may also receive the pupil location (e.g., three-dimensional coordinates indicating the position of the pupil in space) and gaze direction from eye and/or head tracking system 18. Using the target image data, the pupil location, the gaze direction, and stored color calibration information 66, control circuitry 16 may output adjusted image data (sometimes referred to as calibrated image data or color calibrated image data) that is provided to display 14 for display to the viewer.

Figure 7A:
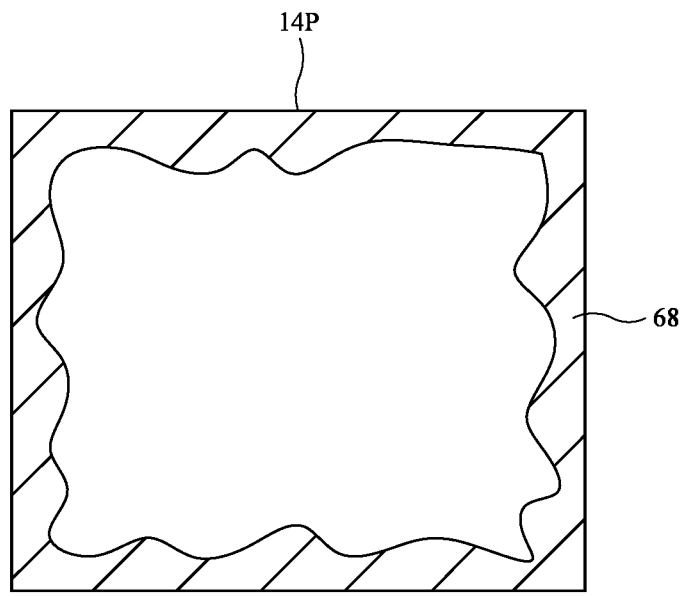
FIGS. 7A and 7B are views of an illustrative display panel through a lens assembly when color calibration is used in accordance with some embodiments.
Figure 7B:
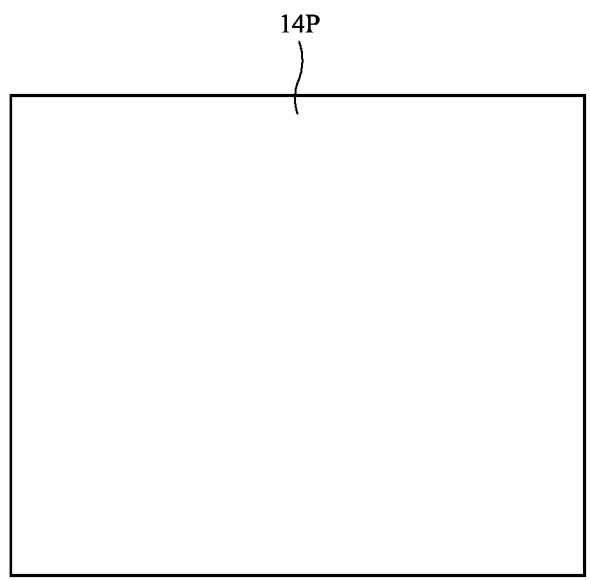

FIGS. 7A and 7B show an example of color calibration in device 10. As shown in FIG. 7A, display panel 14P may display a non-uniform image (e.g., a white screen with non-uniformities 68) that is calibrated for a given pupil location and gaze direction. However, FIG. 7B shows the image as perceived by a viewer with the given pupil location and gaze direction. Since the image on display panel 14P is adjusted using the color calibration data, a uniform image (as in FIG. 7B) is perceived by the viewer.

Color calibration information 66 may include, for various pupil locations and gaze directions, a number of stored optical cross-talk compensation (OXTC) factors. During compensation of the target image data, each pixel may be modified using an associated three-by-three matrix of optical cross-talk compensation factors. The three-by-three matrix of OXTC factors may include a red optical cross-talk compensation factor, a red-to-green optical cross-talk compensation factor, a red-to-blue optical cross-talk compensation factor, a green-to-red optical cross-talk compensation factor, a green optical cross-talk compensation factor, a green-to-blue optical cross-talk compensation factor, a blue-to-red optical cross-talk compensation factor, a blue-to-green optical cross-talk compensation factor, and a blue optical cross-talk compensation factor.

In some embodiments, an optical cross-talk compensation factor may include a gain value, which when applied to image data, scales a target color component grayscale level indicated in the image data. Additionally or alternatively, an optical cross-talk compensation factor may include an offset value, which when applied to image data, biases a target color component grayscale level indicated in the image data.

To apply the OXTC factors, control circuitry may, for example, multiply the three-by-three matrix of OXTC factors for a given pixel location by a three-by-one matrix (e.g., vector) including red component input image data, green component input image data, and blue component input image data. The red component input image data, green component input image data, and blue component input image data is obtained from the target image data in FIG. 6. The result of the matrix multiplication is an adjusted three-by-one matrix with a red component, green component, and blue component that used for the given pixel location in the adjusted image data provided to display 14.

Due to the dependency of color non-uniformity on gaze direction and pupil location. OXTC factors may be stored for various associated gaze direction and pupil location combinations.

The equipment of 400 represents a comprehensive approach to obtaining color calibration information 66. While using the equipment of 400, color non-uniformity measurements (and corresponding OXTC constants) may be generated at a high density across the entire possible range of pupil locations (within eye box 58) and gaze directions.

Consider the example of FIG. 4 where color data is captured across five planes 60 and at twenty points 62 within each plane. In this example, color data is captured at one hundred and twenty-five total points within eye box 58. At each point, color data may be captured for a plurality of different gaze directions. Consider an example where color data is captured for twenty-five gaze directions at each point. This results in 3,125 total capture events (with camera 54 needing to be precisely positioned for each capture event). Analysis of each capture event may produce OXTC factors for the pixels in display panel 14P for an associated gaze direction and pupil location.

Obtaining color calibration information in this type of comprehensive manner may take more manufacturing time than desired. Additionally, manufacturing cost and complexity may be higher than desired. Storing OXTC factors for so many capture events may also consume more memory within control circuitry 16 than desired.

To mitigate the length, cost, and complexity of the color calibration process, display panel testing equipment (as in FIG. 8), lens mapping equipment (as in FIG. 9), and lens transmission measurement equipment (FIG. 10) may be used.

Figure 8:
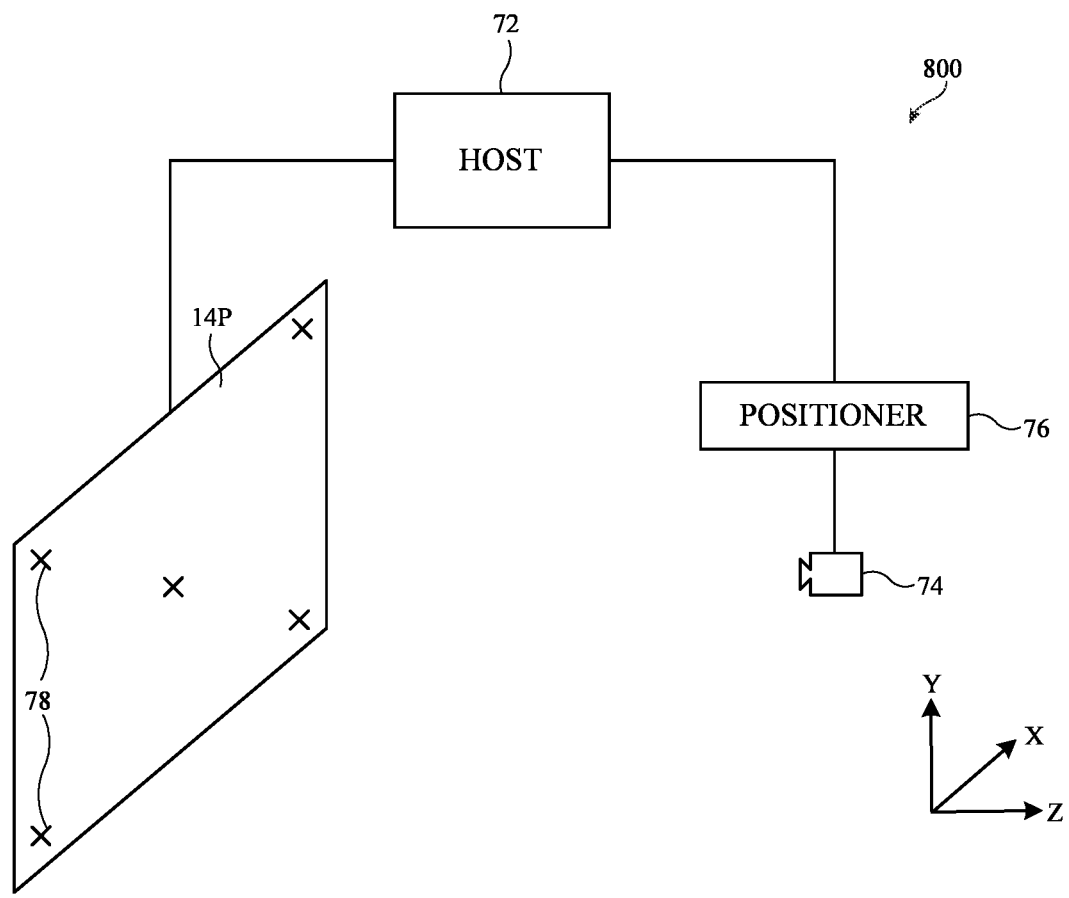
FIG. 8 is a schematic diagram of illustrative display panel testing equipment in accordance with some embodiments.

FIG. 8 is a diagram of display panel testing equipment 800. In the example of FIG. 8, display panel 14P emits light to camera 74 without an intervening lens assembly. In other words, equipment 800 tests a display panel 14P before the display panel is aligned with a corresponding lens assembly.

Camera 74 may be positioned to capture images of display panel 14P. Equipment 800 may include a host 72. Host 72 may include one or more computers. Host 72 may include software that runs autonomously or semi-autonomously on the computer to operate equipment 800.

Host 72 may control operation of display panel 14P and camera 74. For example, host 72 may direct display panel 14P to display certain images, emit light with one or more pixels, etc. Host 72 may direct camera 74 to capture images. Equipment 800 may include one or more computer-controlled positioners that are controlled by host 72. For example, a computer-controlled positioner 76 may be attached to camera 74. Host 72 may control positioner 76 to adjust the position of camera 74.

Equipment 800 may determine color as a function of viewing angle for display panel 14P. In particular, measurements may be taken for one or more locations 78 (e.g., pixels) on display panel 14P. For a given location, camera 74 may capture data that indicates how color changes as a function of viewing angle. The data from the measured locations may be used to interpolate and/or extrapolate the color emission at other locations on display panel 14P.

In the display panel of FIG. 8, the color emission profile varies as a function of position on display panel 14P. This may be due to the type of color filter elements that cover the display panel, as one example. When the color emission profile varies as a function of position on display panel 14P in this manner, the color profile is determined at multiple locations as shown in FIG. 8. However, if the color emission profile does not vary as a function of position on display panel 14P, the color emission profile may instead be determined for only one location on display panel 14P.

Ultimately, the data from equipment 800 is used to determine color as a function of viewing angle across display panel 14P. The example in FIG. 8 of using a camera to test the color emission of display panel 14P is merely illustrative. In general, any desired equipment may be used (e.g., a colorimeter, a spectrometer, etc.). As one possible alternative arrangement, a spectrometer with a goniometer may be used to test the color emission of display panel 14P.

Some calibration information herein may be gathered on a per-device basis. For example, each electronic device 10 may undergo some calibration operations individually (e.g., that device is tested/measured directly). Alternatively, some calibration information for a given device may be gathered without necessarily testing that given device. For example, variance between the display panel color information of each manufactured display panel 14P may be low. Therefore, equipment 800 may be used to determine the average color emission of a given type of display panel 14P. In other words, a given number of display panels (e.g., at least two, at least five, at least ten, at least one hundred, etc.) of a given type are tested using equipment 800. The average color emission (as a function of viewing angle) for the tested panels may subsequently be used for color calibration of additional electronic devices that include display panels of the given type.

In the example of FIG. 8, camera 74 measures color as a function of viewing angle for five locations 78 on display panel 14P. This example is merely illustrative. In general, camera 74 may measure color as a function of viewing angle for any desired number of locations 78 on display panel 14P (e.g., one, more than one, more than four, more than eight, more than twenty, more than fifty, etc.).

The color information obtained using equipment 800 may account for color non-uniformity caused by pixels 22 within display panel 14P having a color emission profile that varies as a function of viewing angle, optical cross talk caused by color filter elements in display panel 14P, etc.

Figure 9:
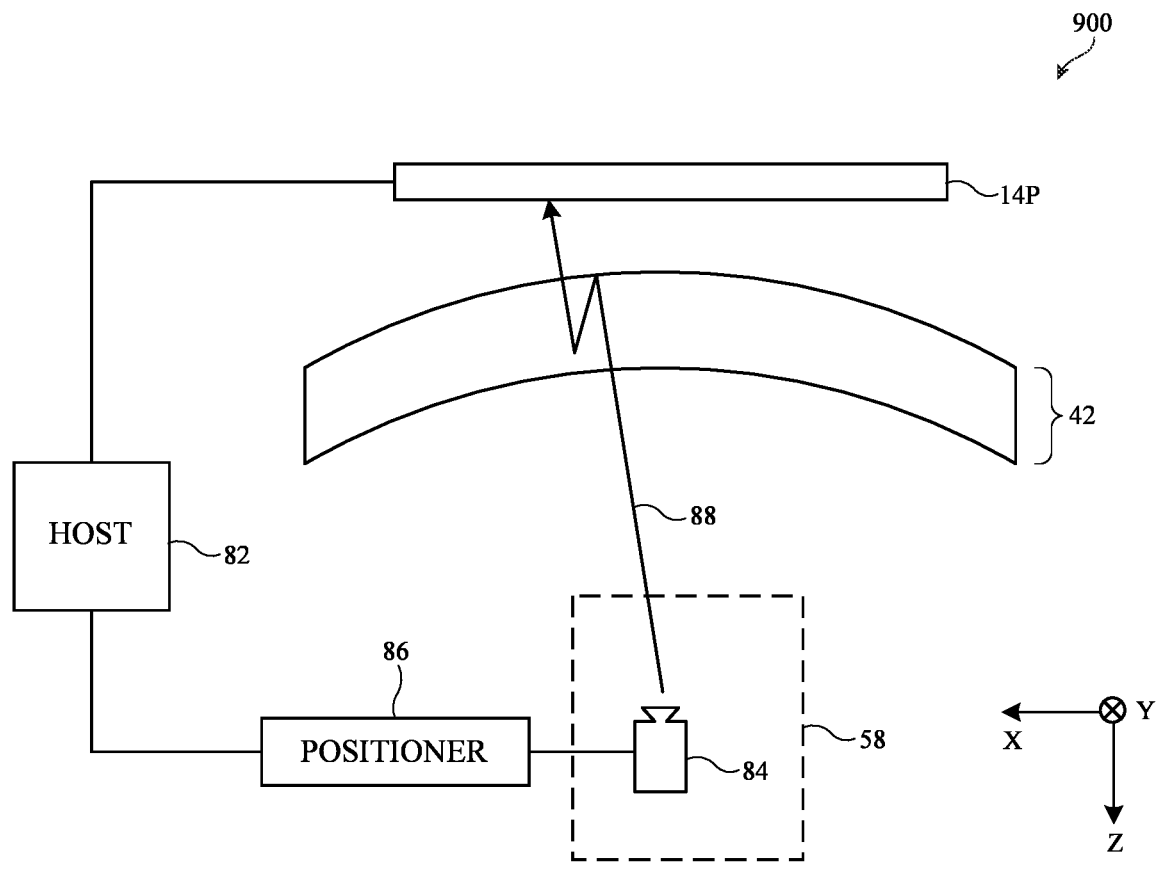
FIG. 9 is a schematic diagram of illustrative lens mapping equipment in accordance with some embodiments.

FIG. 9 is a diagram of lens mapping equipment 900. In the example of FIG. 9, display panel 14P emits light through lens assembly 42 to camera 84. In other words, equipment 900 tests a display panel 14P that is aligned with a corresponding lens assembly 42.

Camera 84 may be positioned to capture images of display panel 14P through lens assembly 42. Equipment 900 may include a host 82. Host 82 may include one or more computers. Host 82 may include software that runs autonomously or semi-autonomously on the computer to operate equipment 900.

Host 82 may control operation of display panel 14P and camera 84. For example, host 82 may direct display panel 14P to display certain images, emit light with one or more pixels, etc. Host 82 may direct camera 84 to capture images. Equipment 900 may include one or more computer-controlled positioners that are controlled by host 82. For example, a computer-controlled positioner 86 may be attached to camera 84. Host 82 may control positioner 86 to adjust the position of camera 84.

Equipment 900 may map pixel locations and incident angles (on display panel 14P) to corresponding pupil locations and gaze directions within eye box 58. Said another way, for each given pupil location within eye box 58, lens mapping equipment 900 may map various gaze directions to corresponding pixels (with corresponding deflection angles) on display panel 14P.

For example, consider ray 88 in FIG. 9. This ray has a corresponding pupil location within eye box 58 and gaze direction (e.g., angles in both the horizontal direction parallel to the X-axis and vertical direction parallel to the Y-axis) at the field-of-view domain (within eye box 58). The ray also has a corresponding pixel location (e.g., the pixel on display panel 14P that the ray intersects) and viewing angle (e.g., incident angles in both the horizontal direction parallel to the X-axis and vertical direction parallel to the Y-axis) in the panel domain. Lens mapping equipment 900 may determine a map that maps the correlation between pupil locations and gaze directions (in the field-of-view domain) to pixel locations and viewing angles (in the panel domain).

Equipment 900 may determine the map associated with display panel 14P and lens assembly 42 by capturing images of display panel 14P through lens assembly 42 using camera 84, by measuring alignment of lens assembly 42 relative to display panel 14P using camera 84, by measuring curvature of lens assembly 42 using camera 84, and/or using ray tracing (e.g., simulating ray paths using known and/or measured curvature and characteristics of lens assembly 42).

The mapping performed using the equipment of FIG. 9 may be performed on a per-device basis. In this way, the mapping compensates for variation in lens-to-panel alignment between devices, variation in distortion caused by the lens assembly between devices, etc. The mapping information obtained using the equipment of FIG. 9 may also be used for geometric distortion calibration operations in electronic device 10 if desired.

Additional color non-uniformity within electronic device 10 may be caused by lens module process variation, film uniformity variance between the lens assemblies in electronic devices, etc. To compensate for this type of color non-uniformity while mitigating manufacturing time, cost, and complexity, a combination of measurement and simulation may be used.

Figure 10:
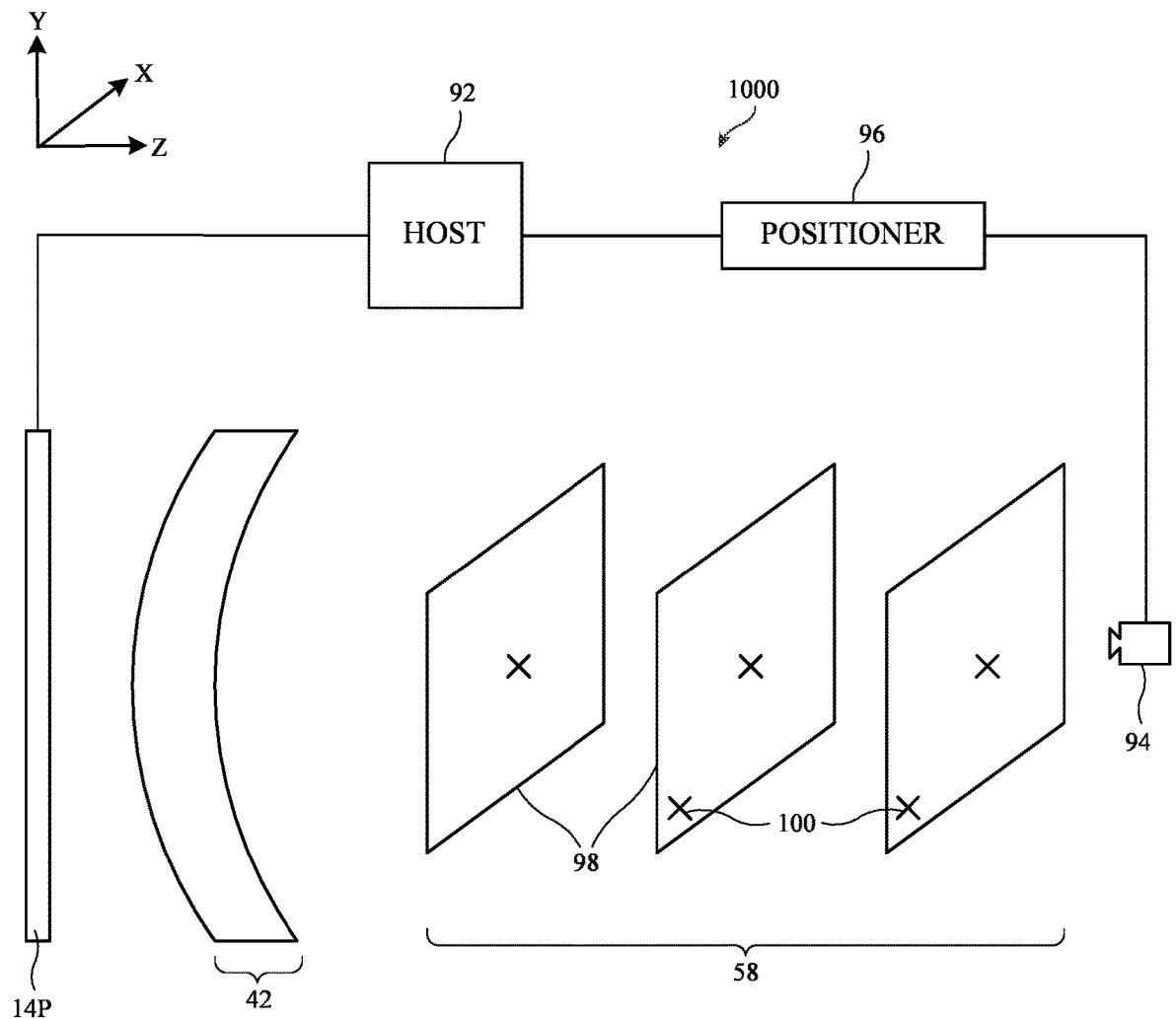
FIG. 10 is a schematic diagram of illustrative lens transmission measurement equipment in accordance with some embodiments.

FIG. 10 is a diagram of illustrative lens transmission measuring equipment 1000 that may be used to obtain color information for an electronic device. In the example of FIG. 10, display panel 14P emits light through lens assembly 42. A camera 94 may be positioned behind lens assembly 42 to capture images of display panel 14P through lens assembly 42. Equipment 1000 may include a host 92. Host 92 may include one or more computers. Host 92 may include software that runs autonomously or semi-autonomously on the computer to operate equipment 1000.

Host 92 may control operation of display panel 14P and camera 94. For example, host 92 may direct display panel 14P to display certain images, emit light with one or more pixels, etc. Host 92 may direct camera 94 to capture images. Equipment 1000 may include one or more computer-controlled positioners that are controlled by host 92. For example, a computer-controlled positioner 96 may be attached to camera 94. Host 92 may control positioner 96 to adjust the position of camera 94.

To obtain lens transmission information, camera 94 may capture images of display panel 14P through lens assembly 42 at a number of points within eye box 58. Eye box 58 is a three-dimensional area that represents the most likely locations for the pupil of a viewer during operation of device 10.

In the example of FIG. 10, camera 94 may capture images of display 14P in a number of different planes 98. Each plane is a different distance from lens assembly 42. Each plane is plane parallel to the XY-plane. As shown in FIG. 10, camera 94 may capture images at a number of different points 100. Each point 100 is at a different position within the eye box.

In FIG. 10, a small number of capture events are used to gather color information. For example, images are captured at less than 25 points, less than 15 points, less than 10 points, less than 6 points, 5 points (as in FIG. 10), less than 5 points, less than 3 points, one point, two points, etc. In other words, in FIG. 10 images are not captured throughout eye box 58. This is in contrast to the equipment of FIG. 4, where images are captured with a relatively high density throughout eye box 58.

The color information measured using the equipment of FIG. 10 may be compared to simulated color information (that is simulated using the display panel color information obtained using equipment 800 from FIG. 8 and lens mapping information that is obtained using equipment 900 from FIG. 9) to extract a lens non-uniformity contribution. The lens non-uniformity contribution determined from the comparison may then be used to simulate color information for the entire eye box.

Using these techniques, simulations may be used to determine sufficiently accurate color calibration information for an entire eye box while obtaining color calibration measurements for only a limited number of locations within the eye box. The color calibration information ultimately determined using these simulations may, similar to as previously discussed, be optical cross-talk compensation factors (e.g., a 3×3 matrix of compensation factors for each pixel location in display panel 14P).

To mitigate storage requirements in the control circuitry of FIG. 6, the OXTC factors may be represented using a polynomial function. The polynomial function may smooth the compensation factors and allow for a large number of compensation factors to be represented using less storage. During operation of electronic device 10, control circuitry 16 may (as shown in FIG. 6) use the pupil location and gaze direction from system 18 to decode OXTC factors for a number of locations across display panel 14P. In one example, OXTC factors may be decoded for only a sparse grid across the display panel (e.g., for fewer pixels than are actually present in the display panel). As an example, OXTC factors may be determined for a 16×20 grid (or grid of another desired size) of pixels. Interpolation (e.g., interpolation) and/or extrapolation may then be used to obtain OXTC factors for every pixel in display panel 14P. The OXTC factors for every pixel in display panel 14P are then used to adjust the target image data into the adjusted image data (that is compensated for color non-uniformity).

The display panel testing equipment of FIG. 8, the lens mapping equipment of FIG. 9, and the lens transmission measurement equipment of FIG. 10 may sometimes collectively be referred to as color calibration testing equipment. If desired, a central host may control operation of equipment 800, 900, and/or 1000 and/or may receive test results from equipment 800, 900, and/or 1000. The central host may include one or more computers. The central host may include software that runs autonomously or semi-autonomously on the computer to operate equipment 800, 900, and 1000. The central host may optionally perform simulations (as discussed in connection with FIG. 10) to determine color calibration information for various locations within the eye box.

Figure 11:
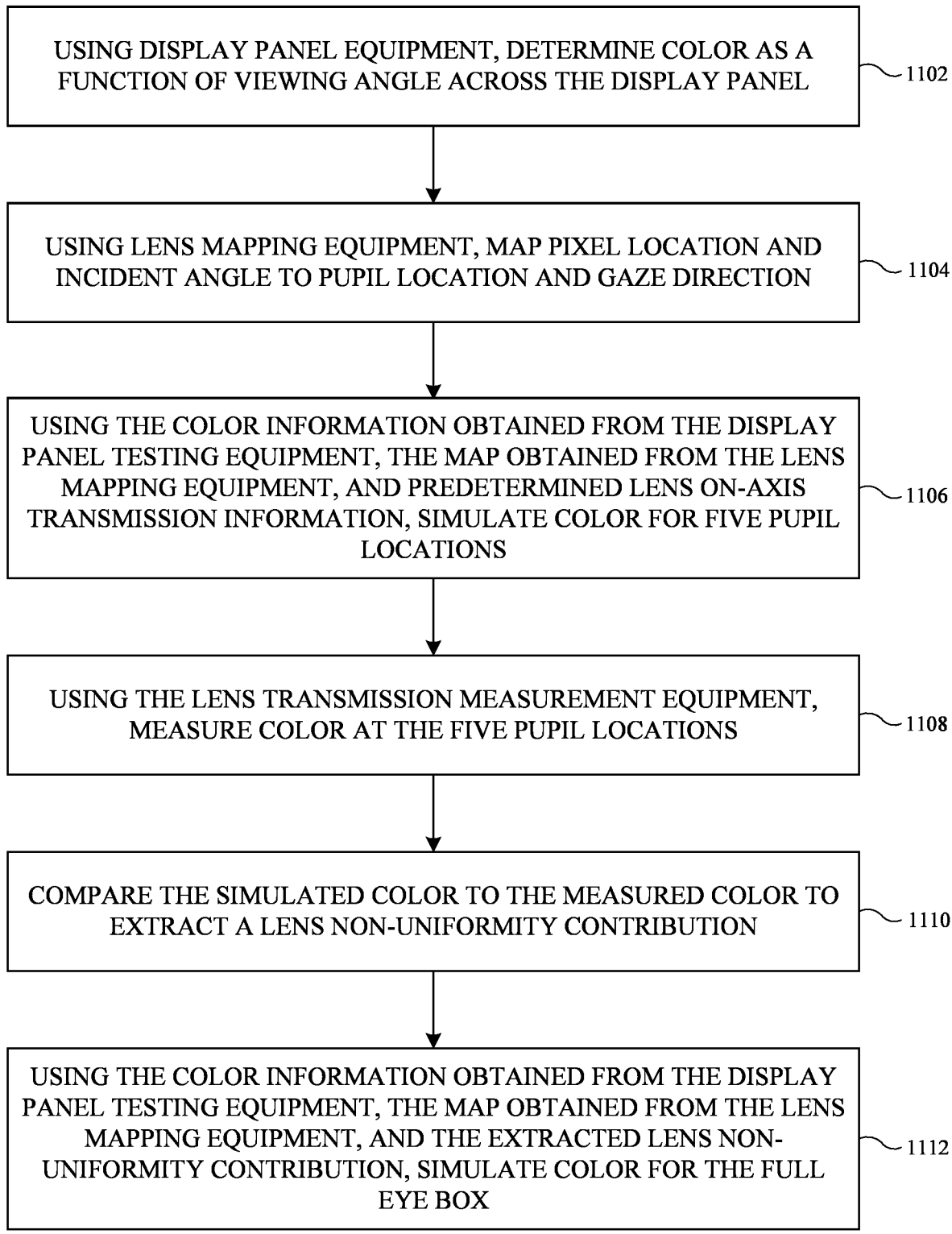
FIG. 11 is a flowchart of illustrative method steps for obtaining color calibration information using measurements and simulations in accordance with some embodiments.

FIG. 11 is a flowchart of illustrative method steps for obtaining color calibration information using measurements and simulations. At step 1102, display panel testing equipment such as display panel testing equipment 800 in FIG. 8 may be used to determine color as a function of viewing angle across the display panel (without an intervening lens assembly). As shown and discussed in connection with FIG. 8, the color emission profile of display panel 14 may be measured as a function of viewing angle at five locations on the display panel (e.g., one location at the center of the display panel and four locations at the four corners of the display panel respectively). This example is merely illustrative and other numbers and positions of locations may be used.

In one possible arrangement, an average color performance for the display panel 14P (as determined by testing multiple display panels at step 1102) may be used as the representative color emission profile for all display panels of that type. This mitigates the need for per-device color emission testing, which mitigates manufacturing cost, complexity, and time.

Next, at step 1104, lens mapping equipment such as lens mapping equipment 900 of FIG. 9 may be used to map pixel location and incident angle (on the display panel) to a corresponding pupil location and gaze direction (within the eye box). As shown and discussed in connection with FIG. 9, the mapping operations may be performed using measurement of light rays, measurement of alignment and/or curvature of lens assembly 42, and/or simulating ray paths using measured and/or known characteristics of the lens assembly (e.g., ray tracing).

The operations of step 1104 may be performed for each manufactured electronic device 10. In this way, the operations of step 1104 account for variance in the alignment between a display panel and a lens assembly in a particular electronic device as well as variance in the shape of the lens assembly itself.

Next, at step 1106, the color information obtained from the display panel testing equipment (e.g., at step 1102), the map obtained from the lens mapping equipment (e.g., at step 1104), and predetermined lens on-axis transmission information may be used to simulate expected color across the display panel for five pupil locations. The predetermined lens on-axis transmission information may be a fixed property of the lens assembly 42 used in electronic device 10. The predetermined lens on-axis transmission information may characterize the transmission of on-axis light through the lens assembly (e.g., light that passes through a center of the lens assembly at an angle parallel to the surface normal of the center of the lens assembly). The simulations may be performed by a central host that operates equipment 800, 900, and 1000, host 72 in equipment 800, host 82 in equipment 900, host 92 in equipment 1000, control circuitry 16 of electronic device 10, and/or other desired electronic equipment.

Simulating the color perceived from the five pupil locations may produce expected color across the display panel at various gaze directions at the five pupil locations. The example of simulating for five pupil locations is merely illustrative. In general, the color may be simulated for any desired number of pupil locations (e.g., 1, more than 1, 2, more than 2, more than 4, less than 25, less than 15, less than 10, less than 6, less than 4, less than 3, etc.).

At step 1108, lens transmission measurement equipment such as lens transmission measurement equipment 1000 in FIG. 10 may be used to measure color at the pupil locations that were simulated at step 1106. For example, when five pupil locations are simulated in step 1106, measurements may be obtained for those five pupil locations at step 1108.

As shown in the example of FIG. 10, the five measurement locations may be distributed across three planes 98. The closest plane of the three planes 98 to lens assembly 42 includes a single measurement location 100 (at the center of the plane). The second-closest plane of the three planes 98 to lens assembly 42 (e.g., the middle of the three planes) includes two measurement locations 100 (one at the center of the plane and one at a corner of the plane). The third-closest (farthest) plane of the three planes 98 to lens assembly 42 includes two measurement locations 100 (one at the center of the plane and one at a corner of the plane). The three center locations may be aligned in a direction parallel to a surface normal of the center of lens assembly 42. The two corner locations may be aligned in a direction parallel to a surface normal of the center of lens assembly 42.

At step 1110, the simulated color results (from step 1106) may be compared to the measured color results (from step 1108) at the common pupil locations to extract a lens non-uniformity contribution. For example, consider the location 100 at the center of the closest plane to lens assembly 42 in FIG. 10. The simulated color results for this location are compared to the measured color results for this location. The comparison may include dividing the measured color results by the simulated color results to obtain a ratio that represents the non-uniformity imparted by lens assembly 42 (relative to the simulation). This process may be repeated for each of the simulated and measured pupil locations (and interpolation and/or extrapolation may be used) to determine the non-uniformity contribution of lens assembly 42 across the eye box. For example, a data set including the ratios at each simulated/measured pupil location may be used to determine a lens non-uniformity contribution across the eye box.

After determining the lens non-uniformity contribution at step 1110, the color information obtained from the display panel testing equipment (e.g., at step 1102), the map obtained from the lens mapping equipment (e.g., at step 1104), (optionally) the predetermined lens on-axis transmission information (which may also be used at step 1106), and the lens non-uniformity contribution (from step 1110) may be used to simulate color for the full eye box (e.g., for a given number of locations in the eye box) at step 1112. The number of locations simulated at step 1112 may be greater than the number of locations measured at step 1108 (and simulated at step 1106) by more than five, more than ten, more than twenty, more than fifty, more than one hundred, more than one hundred and twenty-five, etc. The number of locations simulated at step 1112 may be greater than the number of locations measured at step 1108 (and simulated at step 1106) by a factor of two or more, a factor of four or more, a factor of eight or more, a factor of ten or more, a factor of twelve or more, a factor of twenty or more, etc.

The simulated color information from the full eye box (at step 1112) may be used to determine optical cross-talk compensation factors for the display panel for each position within eye box 58. To mitigate storage requirements in the control circuitry of FIG. 6, the OXTC factors may be represented using a polynomial function, as previously discussed. The polynomial function may smooth the compensation factors and allow for a large number of compensation factors to be represented using less storage. The polynomial function determined using the steps of FIG. 11 may be stored as the color calibration information 66 in control circuitry 16 (as shown in FIG. 6).

Figure 12:
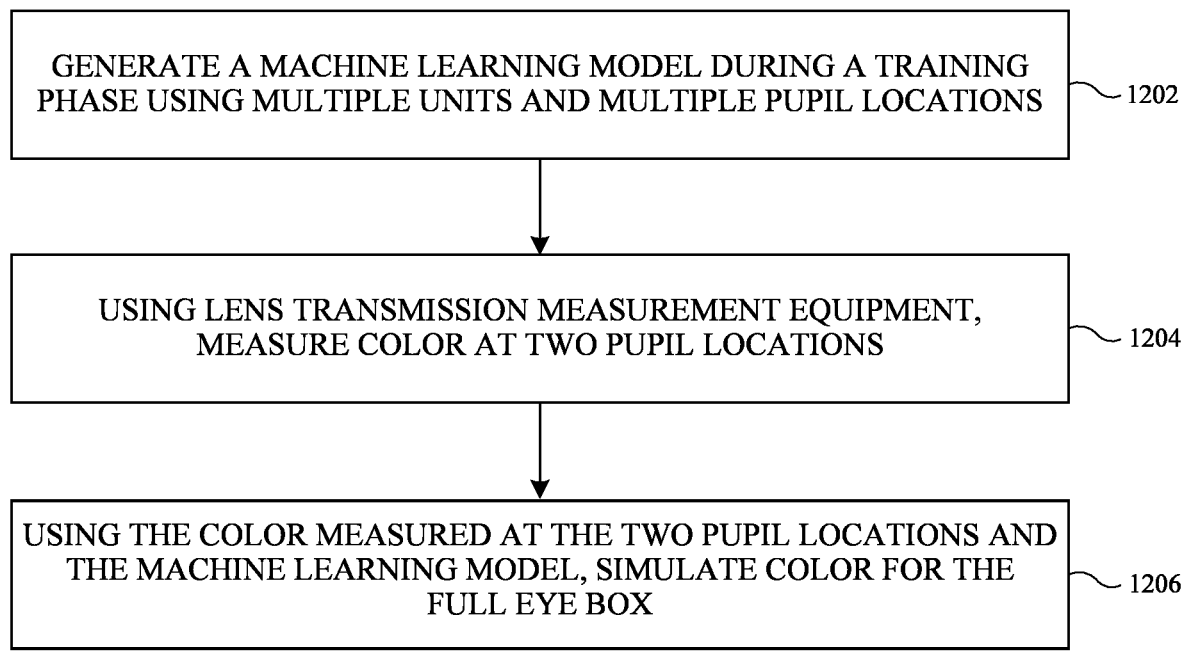
FIG. 12 is a flowchart of illustrative method steps for obtaining color calibration information using measurements and a machine learning model in accordance with some embodiments.

An alternative method for obtaining color calibration information is shown in FIG. 12. FIG. 12 is a flowchart of illustrative method steps for obtaining color calibration information using measurements and a machine learning model. Using the machine learning model as in FIG. 12 may, relative to the technique of FIG. 11, improve the performance of the color calibration procedures while reducing the amount of measurement and computation time required to obtain the color calibration information.

As shown in FIG. 12, at step 1202 a machine learning model may be generated during a training phase using multiple units (e.g., devices 10 with respective lens modules 42 and displays 14). During the training phase, measurements may be taken at a number of pupil locations for each unit (e.g., using the lens transmission measuring equipment 1000 of FIG. 10). The number of pupil locations evaluated for each unit may be greater than 5, greater than 10, greater than 50, greater than 100, greater than 250, greater than 500, greater than 1000, less than 1000, between 250 and 750, etc. The number of pupil locations evaluated may be sufficiently high to have a high density grid of evaluated pupil locations throughout the eye box. The total number of units evaluated may be greater than 5, greater than 10, greater than 50, greater than 100, greater than 250, greater than 500, greater than 1000, less than 1000, between 250 and 750, etc.

The machine learning model generated at step 1202 may be configured to receive measurements from a first number of pupil locations (e.g., one, two, three, four, five, more than five, more than ten, less than ten, less than five, less than three, etc.) as input. The machine learning model may be configured to, based on the measurements from the first number of pupil locations, output color calibration information for a second, higher number of pupil locations distributed throughout the eye box. The second number of pupil locations may be greater than 50, greater than 75, greater than 100, less than 200, between 50 and 150, etc. The second number divided by the first number may be at least 5, at least 10, at least 20, at least 40, at least 50, at least 100, less than 100, between 25 and 75, etc. In one example the machine learning model generated at step 1202 may be configured to receive measurements from 2 pupil locations in the eye box and may be configured to output color calibration information for 108 pupil locations distributed throughout the eye box.

Next, at step 1204, for a particular head-mounted device 10, color may be measured at a first number of locations (e.g., two pupil locations) using lens transmission measurement equipment such as lens transmission measuring equipment 1000 of FIG. 10. The pupil locations of step 1204 may be distributed in any desired manner across the eye box.

Finally, at step 1206, the color measured at the pupil locations from step 1204 may be used in combination with the machine learning model to simulate the color for the full eye box. As discussed in connection with step 1202, the machine learning model may be configured to, based on the measurements from the first number of pupil locations (from step 1204), output color calibration information for a second, higher number of pupil locations distributed throughout the eye box. The second number divided by the first number may be at least 5, at least 10, at least 20, at least 40, at least 50, at least 100, less than 100, between 25 and 75, etc. The machine learning model used at step 1206 may include a feature encoder and a coordinate encoder as well as a decoder.

The foregoing is merely illustrative and various modifications can be made by those skilled in the art without departing from the scope and spirit of the described embodiments. The foregoing embodiments may be implemented individually or in any combination.

What is claimed is:

1. A method of obtaining color calibration information for an electronic device that comprises a display panel of a given type and a lens assembly, wherein the display panel is viewable through the lens assembly from an eye box, the method comprising:
    measuring first information that comprises information regarding color emission as a function of viewing angle for the given type of display panel;
    determining a map of pixel locations and incident angles on the display panel in the electronic device to corresponding pupil locations and gaze directions in the eye box;
    measuring second information that comprises information regarding color at a first number of locations within the eye box;
    using at least the first information, the map, and the second information, simulating color at a second number of locations within the eye box, wherein the second number is greater than the first number; and
    using the simulated color at the second number of locations within the eye box, determining color calibration information for the electronic device.

2. The method defined in claim 1, wherein measuring the first information comprises measuring the first information for the display panel in the electronic device.

3. The method defined in claim 1, wherein measuring the first information comprises measuring the first information for multiple display panels of the given type, the method further comprising:
    determining average color information for the given type of display panel using the measurements for the multiple display panels of the given type, wherein simulating color at the second number of locations within the eye box comprises simulating color at the second number of locations within the eye box using at least the average color information for the given type of display panel.

4. The method defined in claim 1, wherein measuring the first information comprises measuring the first information using a camera.

5. The method defined in claim 1, wherein measuring the first information comprises measuring a color emission profile at multiple locations on the given type of display panel.

6. The method defined in claim 5, wherein the given type of display panel has a center and four corners and wherein the multiple locations comprise a first location at the center and second, third, fourth, and fifth locations at each one of the four corners respectively.

7. The method defined in claim 1, wherein determining the map of pixel locations and incident angles on the display panel in the electronic device to corresponding pupil locations and gaze directions in the eye box comprises performing ray tracing.

8. The method defined in claim 1, wherein determining the map of pixel locations and incident angles on the display panel in the electronic device to corresponding pupil locations and gaze directions in the eye box comprises capturing images of the lens assembly using a camera.

9. The method defined in claim 1, wherein measuring the second information comprises capturing images of the display panel through the lens assembly using a camera at the first number of locations.

10. The method defined in claim 9, wherein the first number of locations comprises:
a first location in a first plane that is a first distance from the lens assembly;
a second location in a second plane that is a second distance from the lens assembly, wherein the second distance is greater than the first distance;
a third location in the second plane;
a fourth location in a third plane that is a third distance from the lens assembly, wherein the third distance is greater than the second distance; and
a fifth location in the third plane.

11. The method defined in claim 10, wherein the first location is in a center of the first plane within the eye box, wherein the second location is in a center of the second plane within the eye box, wherein the third location is in a corner of the second plane within the eye box, wherein the fourth location is in a center of the third plane within the eye box, and wherein the fifth location is in a corner of the third plane within the eye box.

12. The method defined in claim 11, wherein the first, second, and fourth locations are aligned in a direction parallel to a surface normal of the lens assembly.

13. The method defined in claim 12, wherein the third and fifth locations are aligned in the direction parallel to the surface normal of the lens assembly.

14. The method defined in claim 1, further comprising:
using at least the first information and the map, simulating color at the first number of locations within the eye box.

15. The method defined in claim 14, further comprising:
comparing the simulated color at the first number of locations to the measured second information at the first number of locations.

16. The method defined in claim 15, wherein simulating color at the second number of locations within the eye box using at least the first information, the map, and the second information comprises:
simulating color at the second number of locations within the eye box using at least the first information, the map, and the comparison of the simulated color at the first number of locations to the measured second information at the first number of locations.

17. The method defined in claim 1, wherein the second number is greater than the first number by a factor of ten or more.

18. A method, comprising:
measuring an average profile for color emission as a function of viewing angle for multiple display panels of a given type;
for an electronic device that includes a display panel of the given type and a lens assembly, mapping pixel locations and incident angles on the display panel to corresponding pupil locations and gaze directions in an eye box;
using the average profile and the map of pixel locations and incident angles on the display panel to corresponding pupil locations and gaze directions, simulating color of the display panel at a first number of pupil locations in the eye box;
using a camera, measuring the color of the display panel at the first number of pupil locations in the eye box;
using the simulated color of the display panel at the first number of pupil locations and the measured color of the display panel at the first number of pupil locations, extracting a lens non-uniformity contribution; and
using at least the average profile, the map, and the lens non-uniformity contribution, simulating color of the display panel at a second number of pupil locations in the eye box that is greater than the first number.

19. The method defined in claim 18, wherein the second number is greater than the first number by a factor of ten or more.

20. A method, comprising:
using first information, simulating the color of a display panel when viewed through a lens assembly from at least two points;
measuring the color of the display panel when viewed through the lens assembly from the at least two points; and
using at least the first information and a comparison between the simulated color and the measured color, simulating the color of the display panel when viewed through the lens assembly from at least fifty points.

21. A method of obtaining color calibration information for an electronic device that comprises a display panel and a lens assembly, wherein the display panel is viewable through the lens assembly from an eye box, the method comprising:
measuring information regarding a color of the display panel when viewed through the lens assembly at a first number of locations within the eye box; and
using at least the information and a machine learning model, estimating color at a second number of locations within the eye box, wherein the second number is greater than the first number.

22. The method defined in claim 21, wherein the second number is at least 50 times greater than the first number.

* * * * *